US011588385B2

(12) United States Patent
Matznick et al.

(10) Patent No.: US 11,588,385 B2
(45) Date of Patent: Feb. 21, 2023

(54) METHOD FOR GEL CURING A VARNISH OF A STATOR ASSEMBLY

(71) Applicant: GM GLOBAL TECHNOLOGY OPERATIONS LLC, Detroit, MI (US)

(72) Inventors: Dalton D. Matznick, Madison Heights, MI (US); Timothy M. Wilson, Howell, MI (US); Eric J. Ciavarelli, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 17/085,452

(22) Filed: Oct. 30, 2020

(65) Prior Publication Data

US 2022/0140709 A1  May 5, 2022

(51) Int. Cl.
*H02K 15/12* (2006.01)
*H02K 5/08* (2006.01)
*H02K 15/02* (2006.01)

(52) U.S. Cl.
CPC .............. *H02K 15/12* (2013.01); *H02K 5/08* (2013.01); *H02K 15/02* (2013.01)

(58) Field of Classification Search
CPC .......... H02K 15/12; H02K 5/08; H02K 15/02; H02K 11/25; H02K 15/10
See application file for complete search history.

(56) References Cited

U.S. PATENT DOCUMENTS

| 3,839,653 | A | * | 10/1974 | Beddows | H02K 15/066 310/208 |
| 5,689,058 | A | * | 11/1997 | Yuan | G01N 3/56 73/9 |
| 6,750,400 | B2 | * | 6/2004 | Younsi | C08G 73/1035 522/170 |
| 8,344,298 | B2 | * | 1/2013 | Koide | H02K 15/12 219/636 |
| 9,277,600 | B2 | * | 3/2016 | Matsumoto | H02K 15/12 |
| 2008/0276446 | A1 | * | 11/2008 | Amano | B29C 45/14778 29/598 |

(Continued)

FOREIGN PATENT DOCUMENTS

| JP | 2004059411 A | * | 2/2004 | .............. C03C 13/00 |
| JP | 2013005553 A | * | 1/2013 | |

*Primary Examiner* — Peter Dungba Vo
*Assistant Examiner* — Jose K Abraham
(74) *Attorney, Agent, or Firm* — Vivacqua Crane PLLC

(57) ABSTRACT

A method for gel curing a varnish of a stator assembly includes: applying an electrically-insulating material to a plurality of electrical conductors of a stator assembly; monitoring a temperature of the stator assembly using at least one temperature sensor; determining whether the temperature of the stator assembly has reached a target temperature; in response to determining that the temperature of the stator assembly is equal to the target temperature, heating the stator assembly using an induction heating element to maintain the temperature of the stator assembly at the target temperature for a predetermined amount of time; determining whether the temperature of the stator assembly is equal to the final target temperature; in response to determining that the target temperature is not equal to the final target temperature, increasing the target temperature by a predetermined amount of degrees.

11 Claims, 2 Drawing Sheets

(56) References Cited

U.S. PATENT DOCUMENTS

| | | | | |
|---|---|---|---|---|
| 2010/0320194 A1* | 12/2010 | Koide | ............... | H02K 15/12 |
| | | | | 219/635 |
| 2011/0061228 A1* | 3/2011 | Umino | ............... | H02K 15/12 |
| | | | | 29/732 |
| 2011/0302769 A1* | 12/2011 | Saito | ............... | H02K 15/028 |
| | | | | 29/596 |
| 2016/0043604 A1* | 2/2016 | Yoshida | ............ | H02K 3/325 |
| | | | | 310/71 |
| 2016/0152773 A1* | 6/2016 | Murakami | ......... | C08G 73/1035 |
| | | | | 522/170 |
| 2020/0059143 A1* | 2/2020 | Berthold | ............ | H05B 6/105 |
| 2020/0161945 A1* | 5/2020 | Matsubara | ............ | H02K 15/02 |
| 2021/0227646 A1* | 7/2021 | Jin | ................... | H05B 6/36 |

\* cited by examiner

METHOD FOR GEL CURING A VARNISH OF A STATOR ASSEMBLY

INTRODUCTION

The present disclosure generally relates to methods and system for gel curing a varnish of a stator assembly.

During the manufacture of a stator assembly, electrical conductors are mechanically coupled together and electrically insulated from one another. To do so, an electrically-insulating material (i.e., varnish) is applied to the electrical conductors of the stator assembly. The electrically-insulating material is then cured to secure the electrical conductors to each other. However, during curing, at least some of the electrically-insulating material is lost to evaporation, thereby impacting the performance, longevity, and cost of the stator assembly. It is therefore desirable to minimize evaporation of the electrically-insulating material during gel curing.

SUMMARY

The present disclosure describes a system and method that may be used to gel cure an electrically-insulating material (e.g., varnish) in a stator assembly while minimizing evaporation of the electrically-insulating material. In an aspect of the present disclosure, the method for gel curing a varnish of a stator assembly includes: applying an electrically-insulating material to a plurality of electrical conductors of a stator assembly; monitoring a temperature of the stator assembly using at least one temperature sensor; comparing the temperature of the stator assembly with a target temperature; determining whether the temperature of the stator assembly has reached a target temperature; in response to determining that the temperature of the stator assembly is equal to the target temperature, heating the stator assembly using the induction heating element to maintain the temperature of the stator assembly at the target temperature for a predetermined amount of time.

Additionally, the method includes comparing the temperature of the stator assembly with a final target temperature after heating the stator assembly to maintain the temperature of the stator assembly at the target temperature for the predetermined amount of time; determining whether the temperature of the stator assembly is equal to the final target temperature; in response to determining that the target temperature is not equal to the final target temperature, increasing the target temperature by a predetermined amount of degrees. The method further includes repeating monitoring the temperature of the stator assembly, comparing the temperature of the stator assembly with the target temperature, determining whether the temperature of the stator assembly has reached the target temperature, heating the stator assembly using the induction heating element to maintain the temperature of the stator assembly at the target temperature for the predetermined amount of time, comparing the temperature of the stator assembly with the final target temperature, determining whether the temperature of the stator assembly is equal to the final target temperature, and increasing the target temperature by the predetermined amount of degrees until the target temperature is equal to the final target temperature to minimize evaporation of the electrically-insulating material.

The method may further include preheating the stator assembly using the induction heating element before applying the electrically-insulating material to the plurality of electrical conductors of the stator assembly. The stator assembly includes a stator core. The electrical conductors are coupled to the stator core. The electrical conductors protrude from the stator core. The stator assembly defines a cavity extending through the stator core, and a portion of each of the plurality of electrical conductors is outside the stator core. In the method, applying the electrically-insulating material to the portion of the stator assembly may include applying the electrically-insulating material using a nozzle to the portion of each of the plurality of electrical conductors that is outside the stator core.

The stator assembly is attached to a fixture. The fixture is rotatable about a rotational axis to rotate the stator assembly. The rotational axis extends through the cavity defined by the stator core. The method may further include rotating the fixture to rotate the stator assembly about the rotational axis at the same time as the electrically-insulating material is applied to the portion of each of the plurality of electrical conductors that is outside the stator core.

The method may further include moving the induction heating element toward the stator assembly until the induction heating element is disposed inside the cavity of the stator assembly before preheating the stator assembly. In addition, the method may include rotating the fixture to rotate the stator assembly about the rotational axis at the same time as the stator assembly is heated to maintain the temperature of the stator assembly at the target temperature for the predetermined amount of time. The method may further include increasing an electrical power supplied to the induction heating element in response to determining that the temperature of the stator assembly is not equal to the target temperature until the temperature of the stator assembly is equal to the target temperature. At least one temperature sensor may be a pyrometer. The heating element may be an induction coil. The electrically-insulating material may be a resin.

The present disclosure also describes a system for gel curing a varnish of a stator assembly. In an aspect of the present disclosure, the system includes an induction heating element, a stator assembly including a stator core and a plurality of electrical conductors at least partially protruding from the stator core, a nozzle configured to apply an electrically-insulating material to the plurality of electrical conductors, and a fixture attached to the stator assembly. The fixture is rotatable about a rotational axis to rotate the stator assembly about the rotational axis. The system further includes a plurality of temperature sensors configured to measure a temperature of the stator assembly, a power supply electrically connected to the induction heating element, and a controller in communication with the plurality of temperature sensors and the power supply.

The controller in this particular embodiment is programmed to execute the following instructions: (1) monitor the temperature of the stator assembly using the plurality of temperature sensors; (2) compare the temperature of the stator assembly with a target temperature; (3) determine whether the temperature of the stator assembly has reached a target temperature; (4) in response to determining that the temperature of the stator assembly is equal to the target temperature, command the power supply to supply electrical energy to the heating induction element to heat the stator assembly and maintain the temperature of the stator assembly at the target temperature for a predetermined amount of time; (5) compare the temperature of the stator assembly with a final target temperature after heating the stator assembly to maintain the temperature of the stator assembly at the target temperature for the predetermined amount of time; (6) determine whether the temperature of the stator assembly is equal to the final target temperature; (7) in response to determining that the target temperature is not equal to the final target temperature, increase the target temperature by a predetermined amount of degrees; and repeat instructions (1), (2), (3), (4), (5), (6), and (7) until the target temperature is equal to the final target temperature to minimize evaporation of the electrically-insulating material. The controller is programmed to command to power supply to supply electrical energy to the heating induction element to preheat the stator assembly before applying the electrically-insulating material to the plurality of electrical conductors of the stator assembly.

The stator assembly includes a stator core. The electrical conductors are coupled to the stator core. The stator assembly defines a cavity extending through the stator core, and a portion of each of the electrical conductors is outside the stator core.

The system may further include an actuator coupled to the fixture. The controller is in communication with the actuator. The actuator is configured to rotate the fixture about the rotational axis. The controller is programmed to command the actuator to rotate the fixture to rotate the stator assembly about the rotational axis at the same time as the electrically-insulating material is being applied to the portion of each of the plurality of electrical conductors that is outside the stator core. The actuator may be referred to as a first actuator.

The system may further include a second actuator coupled to the heating induction element. The controller is in communication with the second actuator. The second actuator is configured to move the heating induction element along a longitudinal axis, and the controller is programmed to command the second actuator to move the induction heating element toward the stator assembly until the induction heating element is disposed inside the cavity of the stator assembly before preheating the stator assembly. The controller may be programmed to command the second actuator to rotate the fixture to rotate the stator assembly about the rotational axis at the same time as heating the stator assembly to maintain the temperature of the stator assembly at the target temperature for the predetermined amount of time.

The controller may be programmed to command the power supply to increase an electrical power supplied to the induction heating element in response to determining that the temperature of the stator assembly is not equal to the target temperature until the temperature of the stator assembly is equal to the target temperature. At least one of the temperature sensors may be a pyrometer. The induction heating element may be an induction coil, and the electrically-insulating material may be a resin.

The above features and advantages and other features and advantages of the present teachings are readily apparent from the following detailed description of the best modes for carrying out the teachings when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

Figure 1:
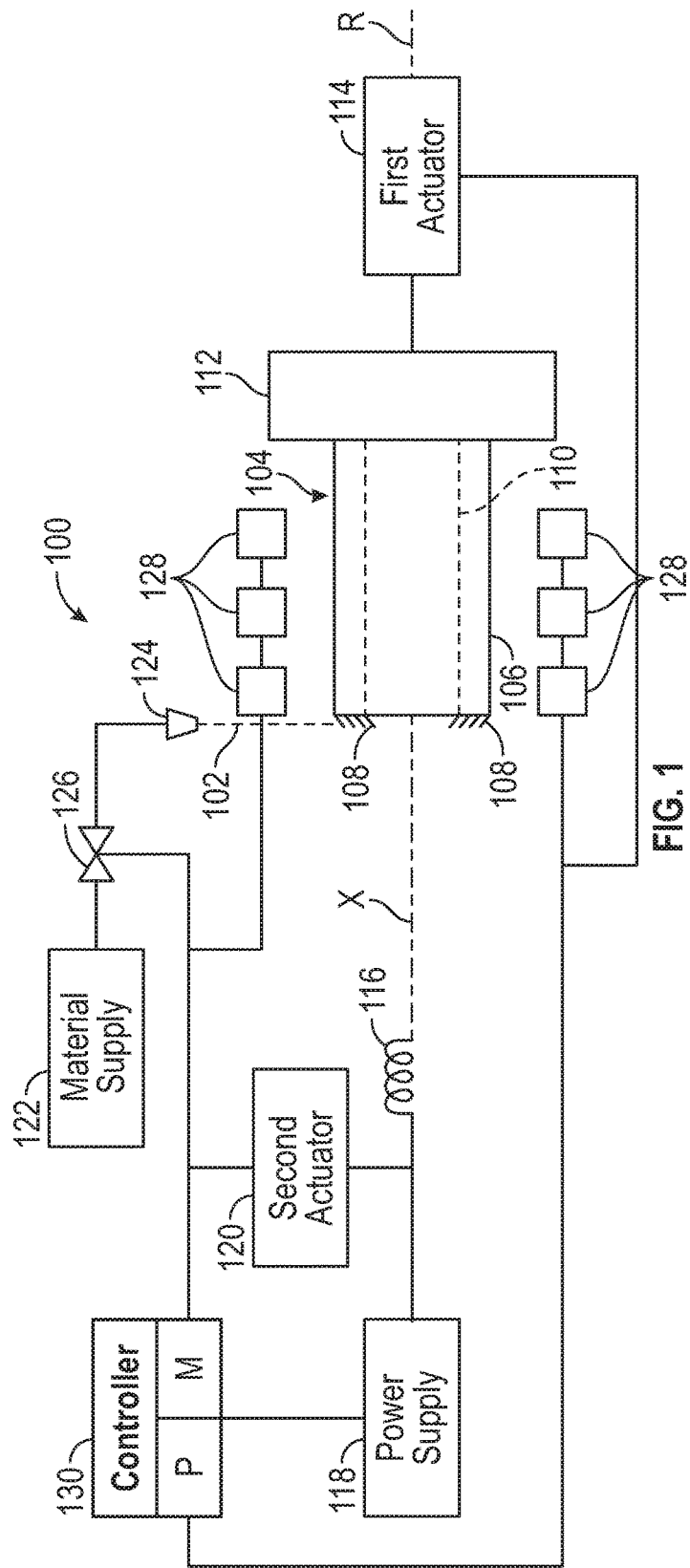
FIG. 1 is a schematic diagram of a system for gel curing an electrically-insulating material in a stator assembly, depicting an induction heating element outside the stator assembly.
Figure 2:
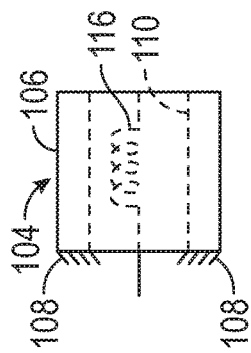
FIG. 2 is a schematic diagram of part of the system of FIG. 1, depicting the induction heating element inside the stator assembly.

With reference to FIG. 1, a system 100 is shown for gel curing an electrically-insulating material 102, such as resin (e.g., epoxy), in a stator assembly 104. In the present disclosure, the term "gel curing" means curing a material so that it is between eighty-five percent and ninety-five percent fully cured. The stator assembly 104 includes a stator core 106 and a plurality of electrical conductors 108 coupled to the stator core 106. At least part of the electrical conductors 108 protrude from the stator core 106. As such, a portion of each of the electrical conductors 108 is outside the stator core 106. The stator assembly 104 defines a cavity 110 extending through the stator core 106.

The system 100 includes a fixture 112 directly attached to the stator assembly 104 to rigidly support the stator assembly 104. The fixture 112 is rotatable about a rotational axis R. Because the fixture 112 is attached to the stator assembly 104, the stator assembly 104 rotates about the rotational axis R upon rotation of the fixture 112 about the rotational axis R. The system 100 further includes a first actuator 114, such as electric motor, coupled to the fixture 112. Upon actuation of the first actuator 114, the first actuator 114 rotates the fixture 112, thereby causing the rotation of the stator assembly 104 about the rotational axis X. The rotational axis R extends through the cavity 110 of the stator assembly 104.

The system 100 further includes an induction heating element 116 and a power supply 118 electrically connected to the induction heating element 116. The induction heating element 116 may be an induction coil to uniformly heat the stator assembly 104 from inside the cavity 110. The power supply 118 is configured to supply electrical energy to the induction heating element 116. Upon receipt of electrical energy from the power supply 118, the induction heating element 116 generates heat.

The system 100 further includes a second actuator 120 coupled to the induction heating element 116, such as an induction heating coil. The second actuator 120 may be a linear motor or a robot and is configured to move the induction heating element 116 linearly along a longitudinal axis X. The longitudinal axis X may be coaxial or parallel to the rotational axis X. Upon actuation of the second actuator 120, the induction heating element 116 moves toward or away from the cavity 110 of the stator assembly 104. During heating, the induction heating element 116 is placed inside the cavity 110 of the stator assembly 104 to uniformly heat the stator assembly 104.

The system 100 further includes an electrically-insulating material supply 122 containing the electrically-insulating material 102. The electrically-insulating material supply 122 is in fluid communication with a nozzle 124 and a valve 126. The valve 126 is disposed between the nozzle 124 and the electrically-insulating material supply 122 to control the flow of the electrically-insulating material 102 to the nozzle 124. The nozzle 124 is positioned to dispense the electrically-insulating material onto the portions of the electrical conductors 108 that are outside the stator core 106.

The system 100 further includes a plurality of temperature sensors 128 configured and positioned to measure the temperature of the stator assembly 104. One or more of the temperature sensors 128 may be pyrometers to avoid interfering with the rotation of the stator assembly 104. Each pyrometer may be calibrated using a thermocouple.

Figure 3:
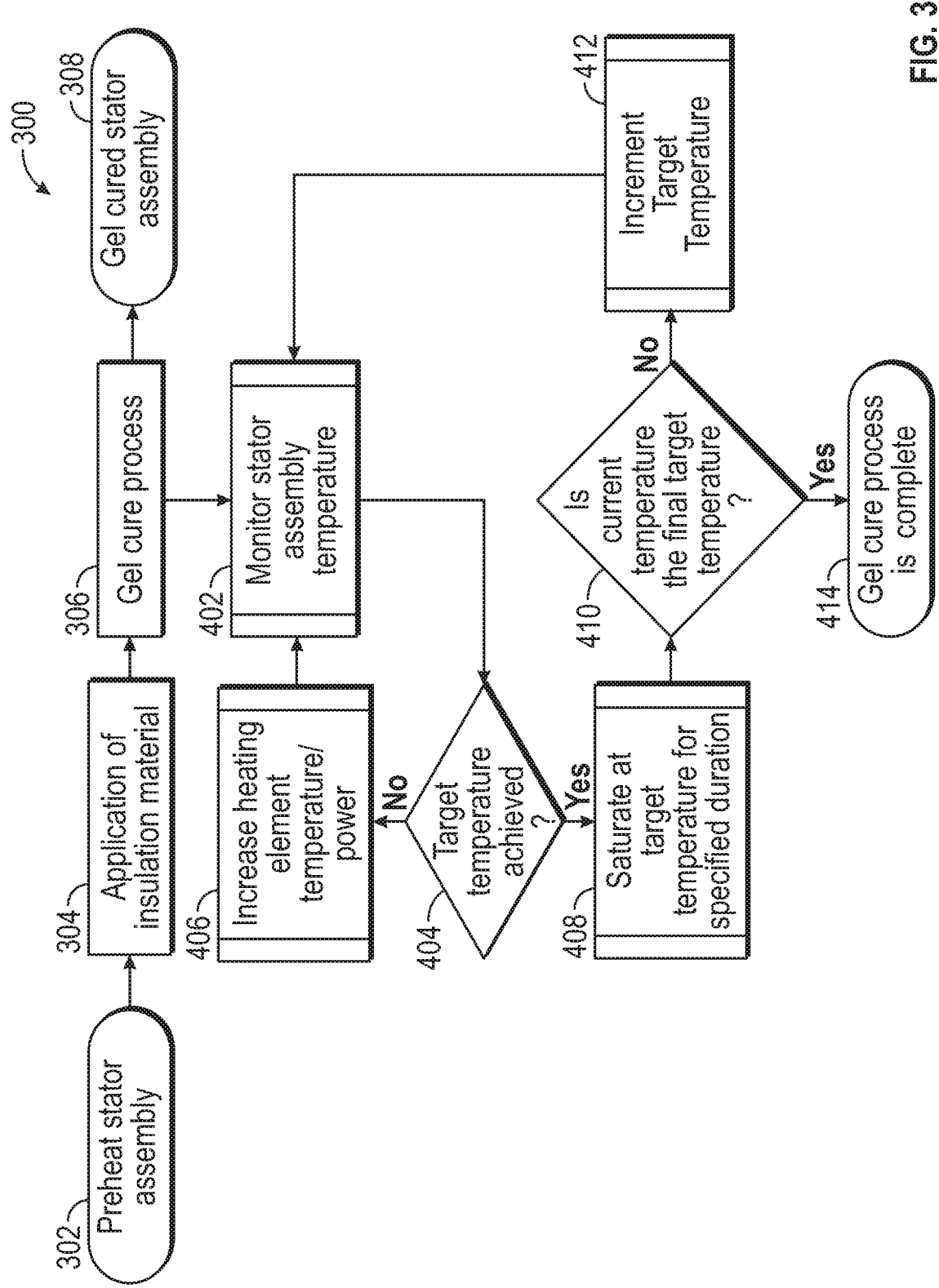
FIG. 3 is a flowchart of a method for gel curing an electrically-insulating material in a stator assembly.

The system 100 includes a controller 130 in electronic communication with various mechanisms or devices configured to perform the method 300 (FIG. 3). While depicted as a single unit for illustrative purposes, the controller 130 may additionally include one or more other controllers, collectively referred to as a "controller." The controller 130 may include a processor P, such as microprocessor or central processing unit (CPU), in communication with various types of computer readable storage devices or media M. Computer readable storage devices or media M may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media M may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 130.

In the depicted embodiment, the controller 130 is in wired or wireless communication with the temperature sensors 128, the first actuator 114, the second actuator 120, the power supply 118, and the valve 126. Accordingly, the controller 130 is configured to control the operation of the first actuator 114, the second actuator 120, the valve 126, and the power supply 118. Further, the controller 130 is configured to receive data from the temperature sensors 128. The data received by the controller 130 from the temperature sensors 128 is indicative of the temperature of the stator assembly 104. Thus, the controller 130 is programmed to determine the temperature of the stator assembly 104 based on data received from the temperature sensors 128.

FIG. 3 illustrates a flowchart of a method 300 for gel curing a varnish (i.e., the electrically-insulating material) of the stator assembly 104. The method 300 begins at block 302. At block 302, the stator assembly 104 is preheated using the induction heating element 116. To do so, the controller 130 command the second actuator 120 to actuate in order to move the induction heating element 116 toward the stator assembly 104 along the longitudinal axis X until the induction heating element 116 is disposed inside the cavity 110 of the stator assembly 104. The method 300 then continues to block 304.

At block 304, the electrically-insulating material 102 is applied to the stator assembly 104. Specifically, the controller 130 commands the valve 126 to open to allow the electrically-insulating material 102 to flow from the electrically-insulating material supply 122 to the nozzle 124. The electrically-insulating material 102 then exits the nozzle 124 and is applied to the portion of the electrical conductors 108 that is outside the stator core 106. The method 300 then proceeds to block 306. At block 306, the gel curing process 400 is performed as discussed in detail below. Once the gel curing process 400 is performed, the electrically-insulating material 102 of the stator assembly 104 is gel cured at block 308.

The gel curing process 400 starts at block 402. At block 402, the controller 130 monitors the temperature of the stator assembly 104 based on the data received from the temperature sensors 128. The gel curing process 400 then proceeds to block 404. At block 404, the controller 130 compares the temperature of the stator assembly 104 with a target temperature. The target temperature may be determined by testing the electrically-insulating material 102, and the value of the target temperature may be stored on the computer readable storage devices or media M of the controller 130. The controller 130 then determines whether the temperature of the stator assembly 104 has reached the target temperature. In other words, the controller 130 determines whether the temperature of the stator assembly 104 is equal to the target temperature. If the temperature of the stator assembly 104 has not reached the target temperature, then the gel curing process 400 proceeds to block 406.

At block 406, the controller 130 commands the power supply 118 to increase the electrical power supplied to the induction heating element 116 in order to increase the temperature of the induction heating element 116. Then, the gel curing process 400 returns to block 402.

If, at block 404, the controller 130 determines that the temperature of the stator assembly has reached the target temperature (i.e., the temperature of the stator assembly 104 is equal to the target temperature), then the gel curing process 400 proceeds to block, 408. At block 408, the stator assembly 104 is heated using the induction heating element 116 to maintain the temperature of the stator assembly 104 at the target temperature for a predetermined amount of time (e.g., thirty seconds). The predetermined amount of time may be stored in the computer readable storage devices or media M of the controller 130 and may be determined by testing the electrically-insulating material 102. Then, the gel curing process 400 continues to block 410.

At block 410, the controller 130 compares the temperature of the stator assembly 104 with a final target temperature. The final target temperature may be stored in the computer readable storage devices or media M of the controller 130 and may be determined by testing the electrically-insulating material 102. Also, at block 408, the controller 130 determines whether the temperature of the stator assembly 104 is equal to the final target temperature.

If the temperature of the stator assembly 104 is not equal to the final target temperature, then the gel curing process 400 proceeds to block 412.

At block 412, the controller 130 increases the target temperature by a predetermined amount of degrees (e.g., ten degrees Fahrenheit). Thus, the controller 130 updates the target temperature stored the computer readable storage devices or media M. The gel curing process 400 then returns to block 402. Accordingly, blocks 402, 404, 408, 410, and possibly 406 may be repeated until the temperature of the stator assembly 104 is until the target temperature (as updated during the gel curing process 400) is equal to the final target temperature to minimize evaporation of the electrically-insulating material 102.

At block 410, if the temperature of the stator assembly 104 is equal to the final target temperature, then the gel curing process 400 proceeds to block 414. At block 414, the gel curing process 400 is completed (i.e., ends).

While the best modes for carrying out the teachings have been described in detail, those familiar with the art to which this disclosure relates will recognize various alternative designs and embodiments for practicing the teachings within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

What is claimed is:

1. A method for gel curing an electrically-insulating material of a stator assembly, comprising:
    applying an electrically-insulating material to a portion of each of a plurality of electrical conductors of a stator assembly, wherein the stator assembly includes a stator core, the electrically-insulating material is a varnish, and the portion of each of the plurality of electrical conductor is outside of the stator core;
    monitoring a temperature of the stator assembly using at least one temperature sensor;
    comparing the temperature of the stator assembly with a target temperature;
    determining whether the temperature of the stator assembly has reached the target temperature;
    in response to determining that the temperature of the stator assembly is equal to the target temperature, heating the stator assembly using an induction heating element to maintain the temperature of the stator assembly at the target temperature for a predetermined amount of time;
    comparing the temperature of the stator assembly with a final target temperature after heating the stator assembly to maintain the temperature of the stator assembly at the target temperature for the predetermined amount of time;
    determining whether the temperature of the stator assembly is equal to the final target temperature;
    in response to determining that the target temperature is not equal to the final target temperature, increasing the target temperature by a predetermined amount of degrees; and
    repeating the monitoring the temperature of the stator assembly, comparing the temperature of the stator assembly with the target temperature, the determining whether the temperature of the stator assembly has reached the target temperature, heating the stator assembly using the induction heating element to maintain the temperature of the stator assembly at the target temperature for the predetermined amount of time, comparing the temperature of the stator assembly with the final target temperature, determining whether the temperature of the stator assembly is equal to the final target temperature, and increasing the target temperature by the predetermined amount of degrees until the target temperature is equal to the final target temperature to minimize evaporation of the electrically-insulating material, thereby gel curing the electrically-insulating material, wherein the gel cured electrically-insulating material is between eighty-five percent and ninety-five percent fully cured.

2. The method of claim 1, further comprising preheating the stator assembly using the induction heating element before applying the electrically-insulating material to the portion of each of the plurality of electrical conductors that is outside the stator core.

3. The method of claim 2, wherein the plurality of electrical conductors are coupled to the stator core, the stator assembly defines a cavity extending through the stator core.

4. The method of claim 3, wherein applying the electrically-insulating material to the portion of each of the plurality of electrical conductors includes applying the electrically-insulating material using a nozzle to the portion of each of the plurality of electrical conductors that is outside the stator core,. wherein the nozzle is positioned to dispense the electrically-insulating material onto the portion of each of the plurality of electrical conductors that is outside the stator core.

5. The method of claim 4, wherein the stator assembly is attached to a fixture, the fixture is rotatable about a rotational axis to rotate the stator assembly, the rotational axis extends through the cavity defined by the stator core, and the method further comprises rotating the fixture to rotate the stator assembly about the rotational axis at the same time as the electrically-insulating material is applied to the portion of each of the plurality of electrical conductors that is outside the stator core.

6. The method of claim 5, further comprising moving the induction heating element toward the stator assembly until the induction heating element is disposed inside the cavity of the stator assembly before preheating the stator assembly.

7. The method of claim 6, further comprising rotating the fixture to rotate the stator assembly about the rotational axis at the same time as the stator assembly is heated to maintain the temperature of the stator assembly at the target temperature for the predetermined amount of time.

8. The method of claim 7, further comprising increasing an electrical power supplied to the induction heating element in response to determining that the temperature of the stator assembly is not equal to the target temperature until the temperature of the stator assembly is equal to the target temperature.

9. The method of claim 1, wherein the at least one temperature sensor is a pyrometer.

10. The method of claim 1, wherein the induction heating element is an induction coil.

11. The method of claim 1, wherein the electrically-insulating material is a resin, the predetermined amount of degrees is ten degrees Fahrenheit, the at least one temperature sensor is a first temperature sensor of a plurality of temperature sensors, the induction heating element is an induction coil;

the method further comprising increasing an electrical power supplied to the induction heating element in response to determining that the temperature of the stator assembly is not equal to the target temperature until the temperature of the stator assembly is equal to the target temperature, the predetermined amount of time is thirty seconds, the plurality of temperature sensors is part of a system;

the system further includes a fixture directly attached to the stator assembly, the stator assembly defines a cavity extending through the stator core, the fixture is rotatable about a rotational axis to rotate the stator assembly, the rotational axis extends through the cavity defined by the stator core, and the method further comprises rotating the fixture to rotate the stator assembly about the rotational axis at the same time as the electrically-insulating material is applied to the portion of each of the plurality of electrical conductors that is outside the stator core, the system includes a controller in communication with the plurality of temperature sensors;

the method further includes a power supply electrically connected to the induction heating element, the controller is in communication with the power supply, the system further includes a first actuator coupled to the fixture;

the method further includes commanding, via the controller, the first actuator to actuate, causing the fixture to rotate about the rotational axis, rotating the fixture causes the stator core to rotate about the rotational axis, applying the electrically-insulating material to the portion of each of the plurality of electrical conductors includes applying the electrically-insulating material using a nozzle to the portion of each of the plurality of electrical conductors that is outside the stator core, wherein the nozzle is positioned to dispense the electrically-insulating material onto the portion of each of the plurality of electrical conductors that is outside the stator core;

the controller includes a processor and a computer readable storage media, the controller is programmed to determine the temperature of the stator assembly based on data received from the plurality of temperature sensors, the controller is programmed to control the first actuator;

the system further includes an electrically-insulating material supply in fluid communication with the nozzle, the electrically-insulating material supply stores the electrically-insulating material;

the system further includes a valve in fluid communication with the nozzle and the electrically-insulating material supply, the valve is downstream of the electrically- insulating material supply, the valve is upstream of the nozzle, the valve is in direct fluid communication with then nozzle to allow the electrically-insulating material to flow from the valve directly to the nozzle, the electrically-insulating material supply is in direct fluid communication with the valve to allow the electrically-insulating material to flow from the electrically-insulating supply directly to the valve;

the method further includes preheating the stator assembly using the induction heating element before applying the electrically- insulating material to the portion of each of the plurality of electrical conductors that is outside the stator core, the first actuator is an electric motor, the controller is in communication with the valve;

the system further includes a second actuator coupled to the induction heating element, the controller is in communication with the motor, the second actuator is a linear motor configured to move the induction heating element linearly;

the method further includes commanding, via the controller, the valve to open to allow the electrically insulating material to flow directly from the valve to the nozzle after preheating the stator assembly, the target temperature is stored on the computer readable media of the controller, the final target temperature is stored on the computer readable media of the controller, commanding, via the controller, the second actuator to actuate in order to move the induction heating element linearly toward the stator assembly along a longitudinal axis until the induction heating element is disposed inside the cavity of the stator core before preheating the stator assembly, the longitudinal axis is coaxial to the rotational axis;

the method further includes commanding, via the controller, the first actuator to actuate to rotate the fixture about the rotational axis to rotate the stator assembly about the rotational axis; and the method further includes commanding, via the controller, the power supply to increase the electrical power supplied to the induction heating element in order to increase the temperature of the induction heating element in response to determining that the target temperature is not equal to the final target temperature, the controller is programmed to monitor the temperature of the stator assembly using the data received from the plurality of sensors, the controller is programmed to compare the temperature of the stator assembly with a target temperature, the controller is programmed to determine whether the temperature of the stator assembly is equal to the final target temperature, and the method ends once the temperature of the stator assembly is equal to the final target temperature.

* * * * *